ns(12) United States Patent
Ebrahimi et al.

(10) Patent No.: US 9,610,639 B2
(45) Date of Patent: Apr. 4, 2017

(54) HEAD UNIT, STOP HOLDER AND METHOD FOR STABILIZING A DRILLING MACHINE

(71) Applicant: Airbus Operations GmbH, Hamburg (DE)

(72) Inventors: Hamid Ebrahimi, Hamburg (DE); Christian Rese, Hamburg (DE); Ruediger Botha, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 166 days.

(21) Appl. No.: 14/331,723

(22) Filed: Jul. 15, 2014

(65) Prior Publication Data
US 2015/0023747 A1 Jan. 22, 2015

(30) Foreign Application Priority Data
Jul. 18, 2013 (DE) .......................... 10 2013 214 154

(51) Int. Cl.
*B23B 47/00* (2006.01)
*B23B 49/00* (2006.01)
(Continued)

(52) U.S. Cl.
CPC .......... *B23B 49/006* (2013.01); *B23B 45/003* (2013.01); *B23B 49/00* (2013.01);
(Continued)

(58) Field of Classification Search
CPC ......... Y10T 408/8925; Y10T 408/5623; Y10T 408/56245; Y10T 408/567; B23B 47/287; B23B 49/02; B23B 49/005; B23B 49/008
See application file for complete search history.

(56) References Cited

U.S. PATENT DOCUMENTS 2,224,480 A * 12/1940 Kartarik ................. B23B 49/02
408/81
2,409,377 A * 10/1946 Miller ...................... G01B 3/28
408/112
(Continued)

FOREIGN PATENT DOCUMENTS

DE 2915429 10/1980
DE 19639122 4/1998
DE 10300202 7/2004

OTHER PUBLICATIONS

German Search Report, Jul. 18, 2013.
Chinese Office Action, Aug. 18, 2016.

*Primary Examiner* — Sunil K Singh
*Assistant Examiner* — Nicole N Ramos
(74) *Attorney, Agent, or Firm* — Greer, Burns & Crain Ltd.

(57) ABSTRACT

A head unit for a stop holder for a drilling machine for purposes of compensating for a height displacement between two adjacent components during the introduction and/or machining of a component hole. The stop holder has a front rest section for purposes of resting on the components. The rest section has an axial projection, which forms a second contact surface displaced relative to a first contact surface in the axial direction, i.e., the tool longitudinal direction. Also disclosed is a stop holder, and a method for compensating for a height displacement between two adjacent components during the introduction and/or machining of a component hole.

10 Claims, 5 Drawing Sheets

(51) Int. Cl.
   *B23B 45/00*   (2006.01)
   *B23B 47/28*   (2006.01)
(52) U.S. Cl.
   CPC ........... *B23B 47/287* (2013.01); *B23B 49/008* (2013.01); *B23B 2270/34* (2013.01); *Y10T 408/03* (2015.01); *Y10T 408/55* (2015.01); *Y10T 408/567* (2015.01); *Y10T 408/56245* (2015.01)

(56) References Cited

U.S. PATENT DOCUMENTS

| | | | | |
|---|---|---|---|---|
| 2,935,905 A | | 5/1960 | Winslow | |
| 3,028,774 A | * | 4/1962 | Hausser | B23B 51/104 408/112 |
| 3,767,313 A | * | 10/1973 | Bohoroquez | B23B 45/008 408/132 |
| 4,083,646 A | * | 4/1978 | Vindez | B23Q 5/326 408/133 |
| 4,256,420 A | * | 3/1981 | Day | B23B 47/287 408/115 R |
| 4,375,341 A | * | 3/1983 | Schulze | B23B 47/28 408/111 |
| 4,752,158 A | * | 6/1988 | Riley | B23B 49/006 408/110 |
| 5,096,342 A | * | 3/1992 | Blankenship | B23B 49/008 408/112 |
| 5,318,391 A | * | 6/1994 | Breiner | B23B 47/28 269/47 |
| 5,649,793 A | * | 7/1997 | Ericksen | B23B 49/023 408/112 |
| 5,961,258 A | | 10/1999 | Ende et al. | |
| 7,073,989 B2 | | 7/2006 | Erickson et al. | |
| 7,226,253 B2 | | 6/2007 | Otten | |
| 7,503,733 B2 | | 3/2009 | Jenkins | |

* cited by examiner

HEAD UNIT, STOP HOLDER AND METHOD FOR STABILIZING A DRILLING MACHINE

CROSS-REFERENCES TO RELATED APPLICATIONS

This application claims the benefit of the German patent application No. 10 2013 214 154.8 filed on Jul. 18, 2013, the entire disclosures of which are incorporated herein by way of reference.

BACKGROUND OF THE INVENTION

The invention relates to a head unit for a stop holder for stabilizing a drilling machine during the placement and/or machining of a component hole, to a stop holder and to a method for stabilizing a drilling machine during the placement and/or machining of a component hole in at least one component that is arranged so as to be adjacent to, or in sections overlapping with, some other component.

Conventional head units of stop holders or stop countersinks for stabilizing a drilling machine during the placement and/or machining of a component hole comprise a tubular round body which by way of a rear assembly section can be detachably attached to the stop holder, an axial tool space for leading-through a tool chucked in the stop holder, and a front rest section for resting on the components. During the placement and/or machining of the component hole the drilling machine is supported, by way of an annular contact surface of the rest section, on the respective component or is pressed against said component. However, supporting the head unit requires a minimal free space on the component in the region of the component hole to be formed or to be machined. If the free space provided by the component around the component hole is not sufficient, the head unit cannot be used or cannot be placed onto the component in a tilt-proof manner. For example, if two components are arranged with height displacement relative to each other, and if a depression is to be made in a hole of the lower component, then the hole needs to be situated a minimum distance from the edge of the upper component in order to ensure a tilt-proof footing of the head unit.

SUMMARY OF THE INVENTION

It is an object of the invention to create a head unit for a stop holder for stabilizing a drilling machine during the placement and/or machining of a component hole, which stop holder allows compensating for a height displacement between two adjacent components. Furthermore, it is an object of the invention to create an alternative stop holder. Moreover, it is an object of the invention to create a method for stabilizing a drilling machine during the placement and/or machining of a component hole by compensating for a height displacement between two adjacent components.

A head unit according to the invention for a stop holder for stabilizing a drilling machine during the placement and/or machining of a component hole in at least one component that is arranged so as to be adjacent to, or in sections overlapping with, some other component has a tubular base body which by way of a rear assembly section can be detachably attached to the stop holder, an axial tool space for leading-through a tool chucked in the stop holder, and a front rest section for resting on the components. According to the invention the rest section comprises a front projection that forms a second contact surface, which is displaced in the axial direction relative to a first contact surface of the rest section.

As a result of the projection a hitherto single-part annular contact surface is divided into two curved sections that are located in different planes. Consequently, in the case of the lack of a minimum distance or minimum clearance in the region of the component hole, the head unit can be positioned against the two components at the same time so that despite the height displacement the head unit and thus the drilling machine is supported over 360°. The curved sections are closed in total over the circumference of the head unit and thus make it possible to achieve the tilt-proof supporting of the drilling machine on components in the region of a height displacement.

In order to be able to react to different height displacements between the components it is advantageous if the rest section interacts with an adjustment element that forms a third contact surface that can be positioned relative to the first contact surface in the axial direction between the first contact surface and the second contact surface. By means of an adjustment of the adjustment element relative to the head unit in the axial direction the distance between the contact surfaces can thus be adjusted.

The flexibility of use of the head unit can be increased if the third contact surface can be displaced in the axial direction beyond the second contact surface. This makes it also possible to use the head unit for the tilt-proof supporting of the drilling machine in those cases where there is minimum clearance in the region of the component hole to be formed or machined, and where the head unit is to be supported only by the components that accommodate the component hole. In this case the third contact surface acts as a single-part annular contact surface.

In a technically simple exemplary embodiment the adjustment element is an adjustment ring that is guided on the rest section so as to be movable in the axial direction.

Setting the adjustment element can be achieved in an infinitely variable, sensitive and precise manner if the rest section has an external thread, and the adjustment ring has an internal thread that interacts with the external thread.

In order to prevent movement of the adjustment ring or adjustment element from a set target position it is advantageous if the rest section interacts with a securing element for undoably securing the adjustment element in its target position.

A securing ring that is movably guided on the rest section in the axial direction, which securing ring at the front can directly or indirectly be made to contact the adjustment ring, is one embodiment of a securing element comprising a technically simple design.

Handling of the securing ring can be further simplified if it has an internal thread that corresponds to the external thread of the rest section so that the securing ring meshes with the same external thread as does the adjustment ring.

A stop holder according to the invention has a head unit according to the invention and thus makes it possible to achieve precise drilling, countersinking, deburring, reaming and the like.

In a method according to the invention for stabilizing a drilling machine during the placement and/or machining of a component hole in at least one component that is arranged so as to be adjacent to, or in sections overlapping with, some other component, first a height displacement between the components is measured. Then the height displacement on a stop holder is set. Subsequently the drilling machine with the mounted stop holder is positioned on the components in a target position, wherein a contact surface of a head unit of the stop holder is pressed against the lower component, and a further contact surface is pressed against the upper component. Finally the component hole is placed in at least one of the components or is machined.

As a result of setting the height displacement between the components in the region of the component hole the head unit is placed onto both components and thus over its entire rest section, and thus tilt-proof stabilization of the drilling machine during the placement and/or machining of the component hole is achieved.

In order to prevent misalignment of the head unit during the placement and/or machining of the component hole, in an exemplary embodiment the height displacement can be secured on the head unit.

Other advantageous exemplary embodiments of the invention are the subject of further subordinate claims.

BRIEF DESCRIPTION OF THE DRAWINGS

Below, preferred exemplary embodiments of the invention are explained in more detail with reference to diagrammatic illustrations as follows.

DETAILED DESCRIPTION OF THE PREFERRED EMBODIMENTS

Figure 1:
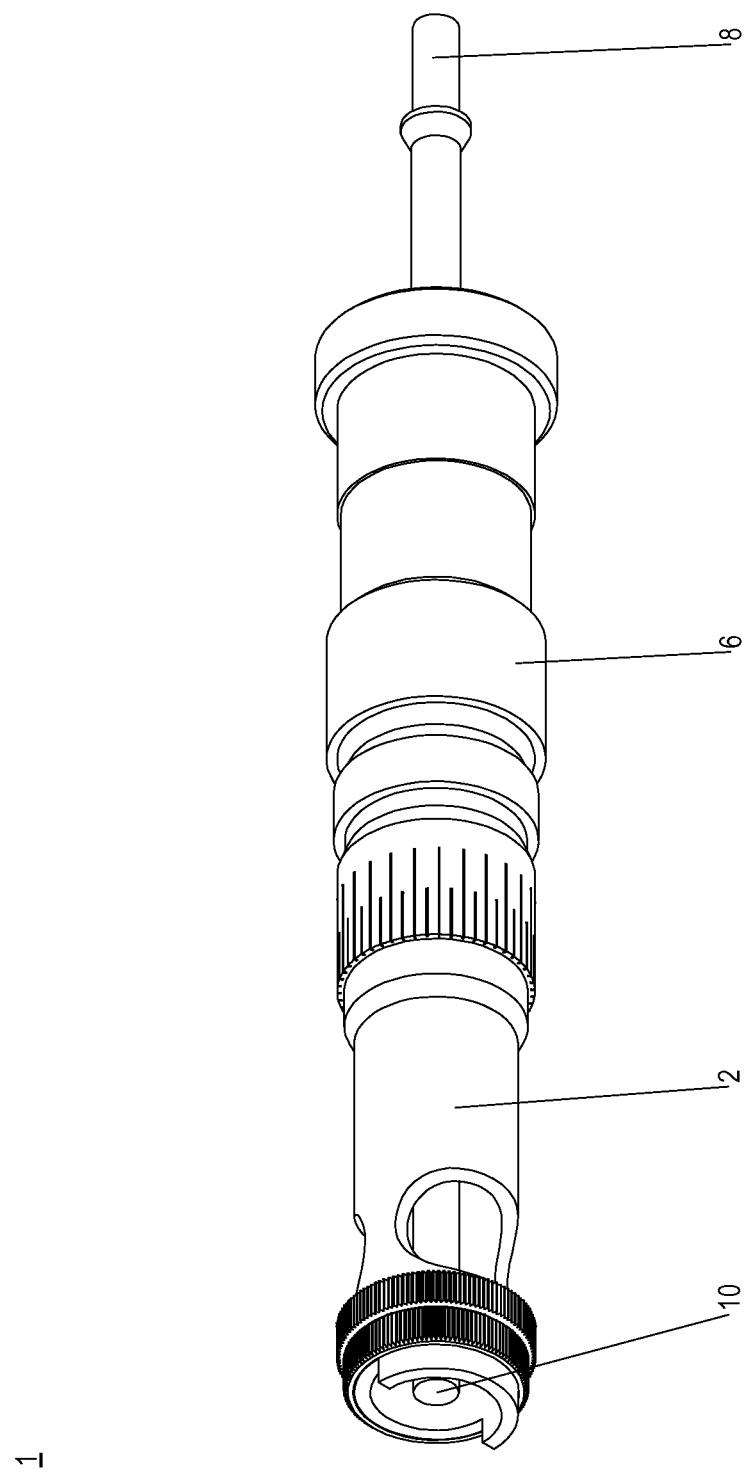
FIG. 1 shows a lateral view of a stop holder according to the invention with a head unit according to the invention.

FIG. 1 shows a lateral view of a stop holder 1 or stop countersink for a drilling machine with a head unit 2 according to the invention for stabilizing a drilling machine during the placement and/or machining of a component hole 4 (see FIG. 2), with an intermediate piece 6 for holding a tool and for setting a machining depth, and with a shaft 8 for being clamped in a drilling machine chuck for establishing an operative connection with a tool 10 chucked in the stop holder 1.

Figure 2:
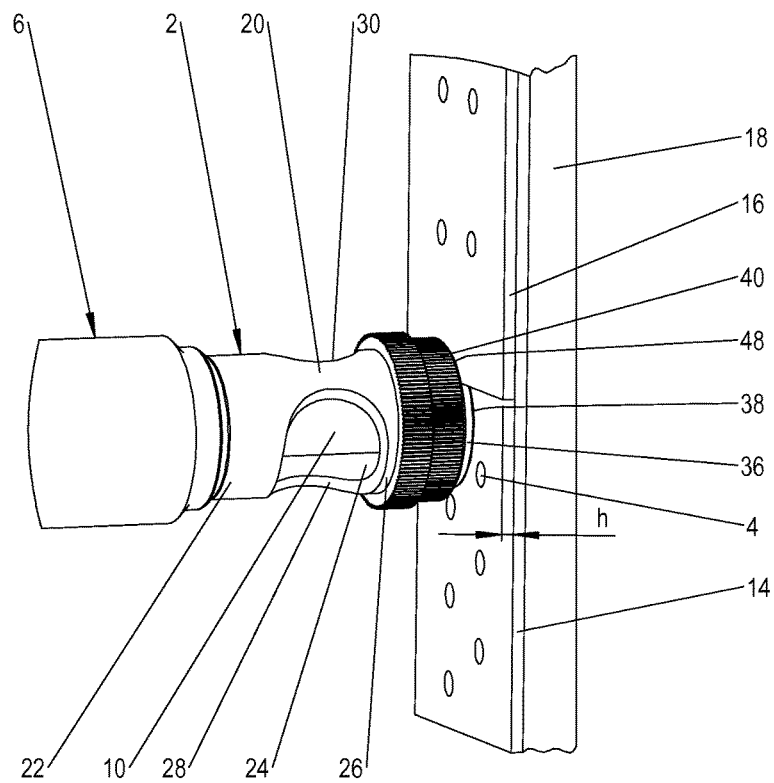
FIG. 2 shows the stop holder in the region of its head unit during the placement and/or machining of a component hole.

FIG. 2 shows the stop holder 1 in operation, mounted on a drilling machine. Since in the exemplary embodiment shown the component hole 4 is covered up by the head unit 2, instead an adjacent hole comprises the reference character 4. In the exemplary embodiment shown, the component hole 4 is to comprise a depression 12 on the orifice end (see FIG. 8). Of course, the stop holder 1 can also be used for placing the component hole 4 per se or for placing the component hole 4 with subsequent depression 12 in a step for deburring the component hole 4 and the like. This depends on the tool 10 chucked in the drilling machine.

The component hole 4 is placed in a component 14 that comprises a height displacement h relative to an adjacent component 16. In particular, in the exemplary embodiment shown, the components 14, 16 are arranged so as to be overlapping in sections, wherein the component 14 forms the lower component, and the component 16 forms the upper component. For example, the components 14, 16 are skin fields of an aircraft fuselage, which skin fields together with further skin fields form a fuselage barrel segment of the aircraft fuselage. The components 14, 16 extend in the longitudinal direction of the aircraft fuselage to be formed; for the purpose of preparing a butt joint with an adjacent fuselage barrel segment they are attached, by means of rivets (not shown), to a primary structure 18 which extends in the circumferential direction of the aircraft fuselage to be formed.

The head unit 2 makes it possible to compensate for a height displacement h; it has a tubular base body 20 that comprises a rear assembly section 22, delimits a tool space 24 extending in the axial direction for accommodating the tool 10 chucked in the stop holder 1, and comprises a front rest section 26 for resting on the components 14, 16. With the tool 10 firmly chucked, and with the stop holder 1 mounted, the axial direction is the direction along which the tool 10 is moved to and fro during machining; in other words it is identical to the tool longitudinal axis. For visual control of the drilling progress or countersinking progress and for carrying away swarf, two opposing lateral openings 28, 30 have been provided in the base body 20 between the assembly section 22 and the rest section 26.

Figure 3:
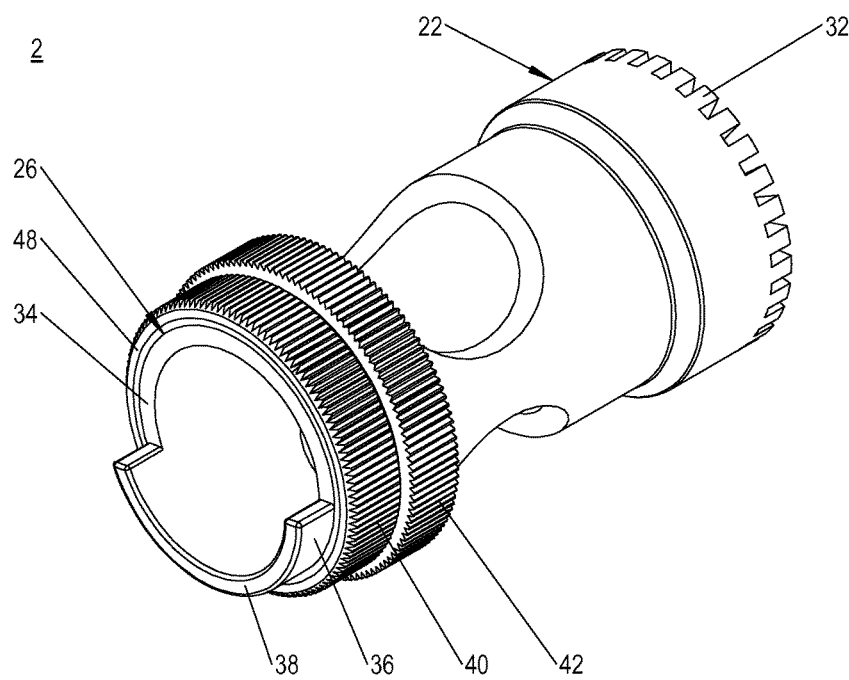
FIG. 3 shows a perspective view of the head unit in a home position.
Figure 4:
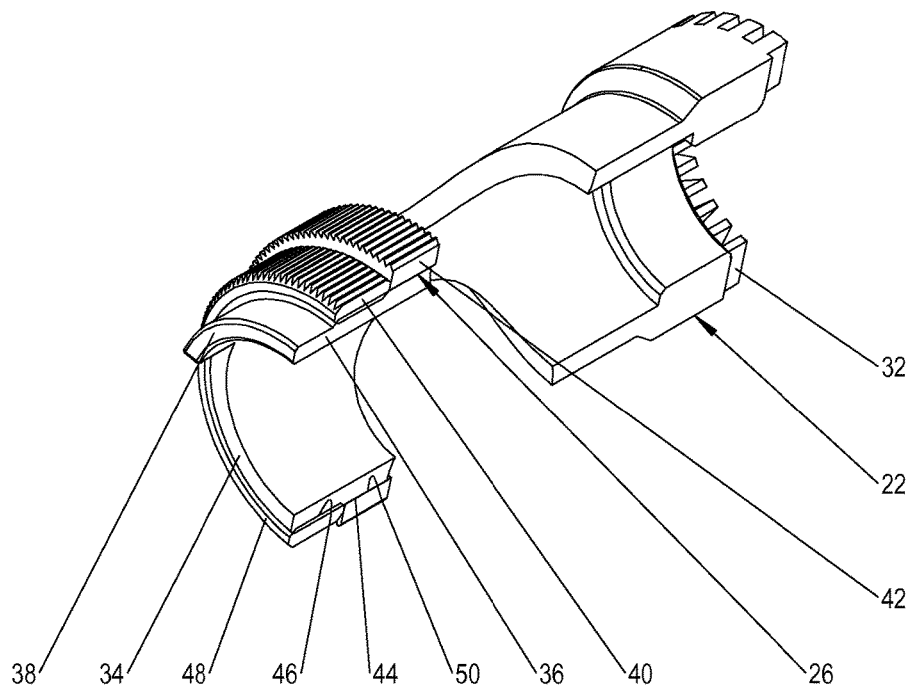
FIG. 4 shows a longitudinal section of the head unit in its home position.

As shown in FIGS. 3 and 4, the assembly section 22 comprises a toothed ring 32, which extends rearwards in the axial direction, for accommodation in a corresponding accommodation device of the intermediate piece 6. The implementation of the assembly section 22 with a toothed ring 32, its mounting on the intermediate piece 6, as well as the intermediate piece 6 per se and its mounting on the drilling machine, are carried out in a conventional manner so that there is no need to provide details relating to the assembly section 22 and to the intermediate piece 6.

According to FIGS. 3 and 4 the rest section 26 comprises a first contact surface 34, from which a front projection 36 extends. The projection 36 forms a second contact surface 38 that in the axial direction is displaced relative to the first contact surface 34. The first contact surface 34 and the second contact surface 38 are both arc-shaped and together form a step-shaped annular contact surface that is enclosed over 360°. They are aligned orthogonally to the axial direction and are thus situated in planes that are displaced parallel to each other. In the exemplary embodiments shown the first contact surface 34 encompasses a greater bend angle than the second contact surface 38. Of course, it is also possible for both contact surfaces 34, 38 to comprise identical bend angles, or for the second contact surface 38 to encompass a greater bend angle than does the first contact surface 34.

The projection 36 has been provided to compensate for the height displacement h, wherein for the purpose of individually setting the head unit 1 comprises an adjustment element 40 and a securing element 42 that are guided on the head unit 2 so as to be slideable or displaceable in the axial direction.

In this exemplary embodiment the adjustment element 40 is designed as an adjustment ring that encompasses the rest section 26 and is slideable in an infinitely variable manner on the aforesaid. For slideability in an infinitely variable manner, in the exemplary embodiment shown the adjustment ring 40 is in thread engagement with the rest section 26, wherein the rest section 26 comprises an external thread 44, and the adjustment ring 40 comprises an internal thread 46 that corresponds to the external thread 44. In particular, the adjustment element 40 forms a third contact surface 48 whose axial distance to the second contact surface 38 can be set. As a result of the adjustability relative to the second contact surface 38 the third contact surface 48 forms an alternative contact surface to the first contact surface 34. The third contact surface 48 is also oriented so as to be orthogonal to the axial direction, and is thus positioned in a parallel displacement plane relative to the second contact surface 38.

In order to be able to reliably guide the adjustment element 40 on the rest section 26 even when the third contact surface 48 of said adjustment element 40 has been displaced beyond the second contact surface 38, the adjustment element 40 has an axial length that is greater than an axial length of the projection 36. As a result of the displacement or the third contact surface 48 beyond the projection 36 it is possible to use the head unit 2 even if there is no height displacement h, because in that case the third contact surface 48, because of its positioning in front of the projection 36, acts as a single-part annular contact surface.

In this exemplary embodiment the securing element 42 is designed as a securing ring that is also slideable or displaceable in the axial direction, in an infinitely variable manner, on the rest section 26. Said securing ring is used for fixing the adjustment ring 40 in a target position and thus for preventing accidental misalignment of the height displacement h set on the head unit 2. In the exemplary embodiment shown, for axial displacement the securing ring 42 comprises an internal thread 50 that corresponds to the external thread 44. For fixing the adjustment ring 40 in its target position the securing ring 42 is screwed at the front against the adjustment ring 40 until the latter is canted on the external thread 44. For reliable handling of the securing ring 42, in the exemplary embodiment shown its external diameter is greater than that of the adjustment ring 40.

Below, a method according to the invention for stabilizing a drilling machine with the use of the stop holder 1 and in particular with the use of the head unit 2 is explained.

Figure 5:
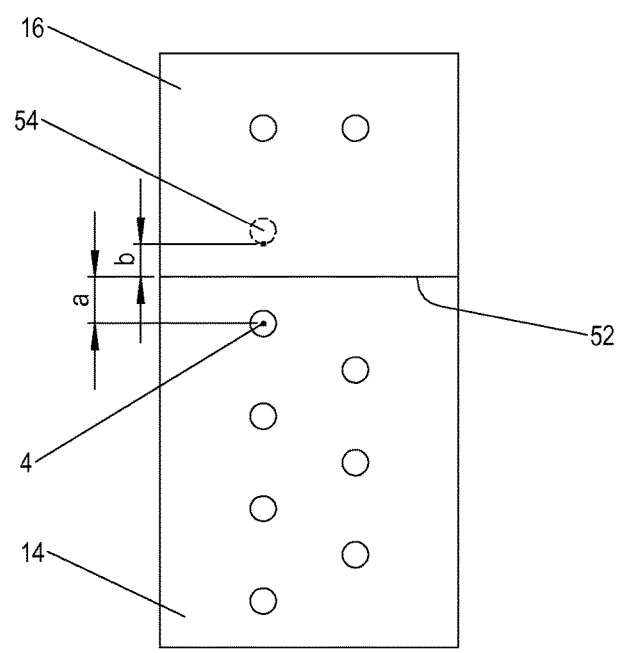
FIG. 5 shows a top view of two adjacent components, which form a height displacement, for machining a component hole.
Figure 8:
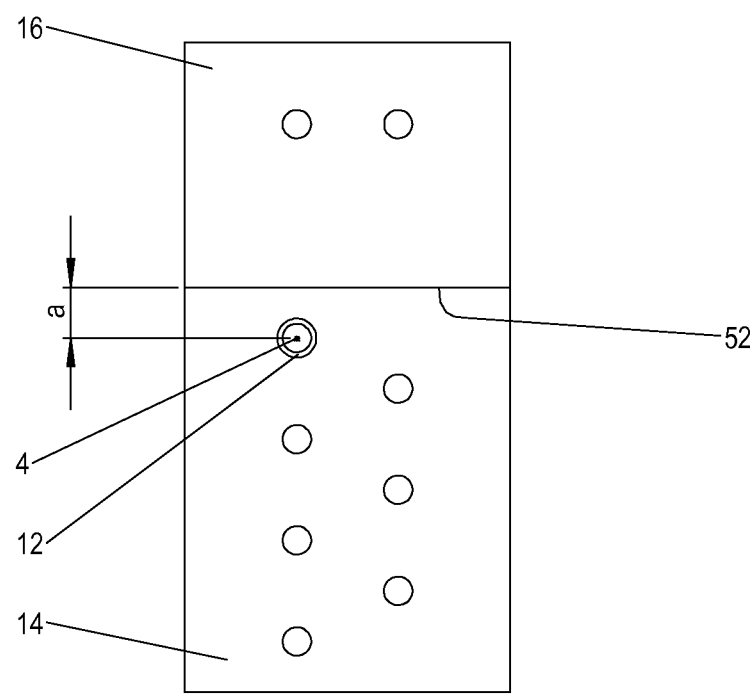
FIG. 8 shows the components of FIG. 5 following machining of the component hole.

For example, the left-hand upper component hole 4 shown in FIG. 5 is to comprise the depression 12 as shown in FIG. 8. As already explained in the context of FIG. 1, the component hole 4 is formed in a lower component 14 that in sections overlaps with an upper component 16. The component hole 4 is spaced apart from a close-by edge 52 of the upper component 16 in such a manner that a distance a between the component hole 4 and the edge 52 is insufficient for the exclusive positioning of the head unit 2 on the lower component 14. For the purpose of forming the depression 12 the head unit 2 thus in sections needs to be supported on both components 14, 16 in order to achieve an annular support of the head unit 2, which support is enclosed over 360°. Of course, the head unit 2 can also be used if, as indicated in FIG. 5, a component hole 54 is to be made or machined in the upper component 16 and a distance b between the component hole 54 and the edge 52 is also insufficient to fully support the head unit 2 on the upper component 16. A minimum distance for the exclusive support of the head unit 2 on the lower component 14 or the upper component 16 equals or exceeds (≥) an external diameter of the rest section 26, or with the adjustment ring 40 screwed into place equals or exceeds (≥) an external diameter of the adjustment ring 40.

At the start of implementing the method the height displacement h of the components 14, 16 relative to each other is determined.

Figure 6:
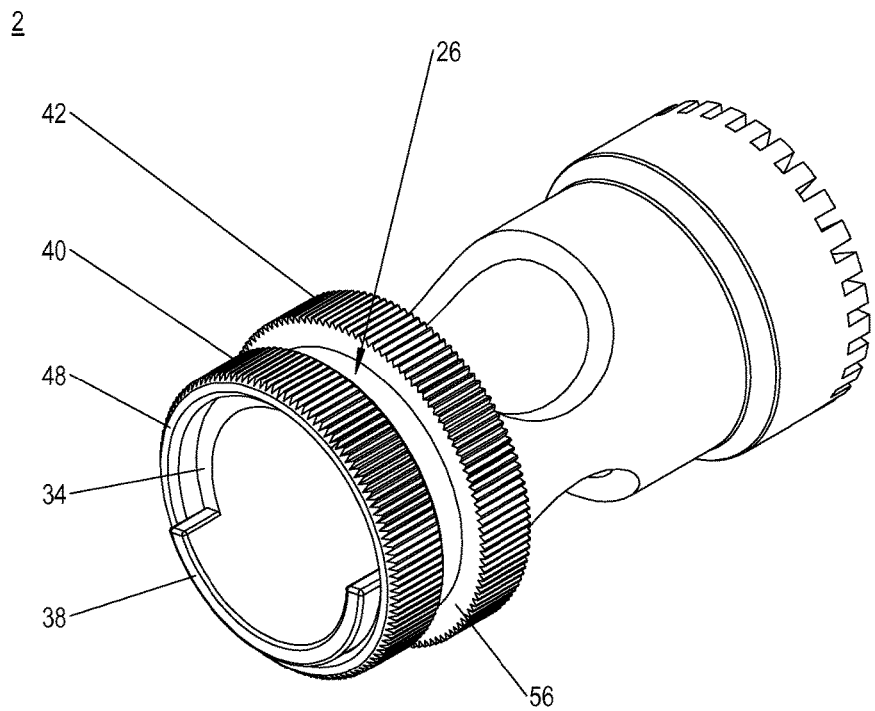
FIG. 6 shows the head unit during adjustment of a height displacement.
Figure 7:
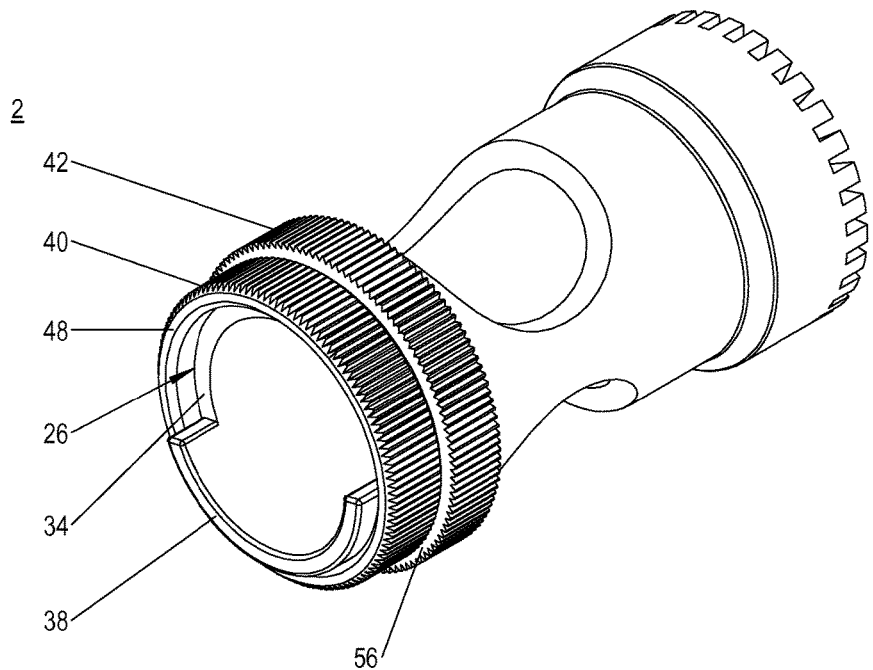
FIG. 7 shows the head unit with locked height displacement.

Subsequently the height displacement h is transferred to the head unit 2. In this arrangement the stop holder 1 can either still be separate from the drilling machine or it can already be installed on it. If the axial distance between the first or rear contact surface 34 and the second or front contact surface 38 is greater than the identified height displacement h, as shown in FIG. 6 the height displacement h is set by the rotation of the adjustment ring 40 relative to the front contact surface 38 between the third or displaceable contact surface 48 and the front contact surface 38. After the height displacement h has been set, as indicated in FIG. 7 the adjustment ring 40 is secured in its target position by means of rotation of the securing ring 42 relative to the adjustment ring 40 on the rest section 26. In this process the front surface 56 of the securing element 42 is screwed directly against the adjustment ring 40 so that the adjustment ring 40 is canted.

After transferring and securing the height displacement h to and on the head unit 2, as indicated in FIG. 2 the drilling machine with the mounted stop holder 1 is positioned on the components 14, 16. The drilling machine is oriented so that the tool 10 is aligned with the component hole 4, and the head unit 2 with the second contact surface 38 (the contact surface of the projection 36) is pressed against the lower component 14 and with the third contact surface 48 (the contact surface of the adjustment ring 40) is pressed against the upper component 16. After this the drilling machine is in its target alignment and is supported in a tilt-proof manner by the components 14, 16. At the front the head unit 2 rests flat against the components 14, 16, and the tool 10 is oriented so as to be orthogonal to the components 14, 16.

Finally the depression 12 diagrammatically shown in FIG. 8 is made in the component hole 4 by means of a feed motion of the tool 10 in the axial direction.

Disclosed is a head unit for a stop holder for a drilling machine for purposes of compensating for a height displacement between two adjacent components during the placement and/or machining of a component hole, which stop holder has a front rest section for purposes of resting on the components, wherein the rest section has an axial projection, which forms a second contact surface displaced relative to a first contact surface in the axial direction or tool longitudinal direction; also disclosed is a stop holder, and a method for compensating for a height displacement between two adjacent components during the placement and/or machining of a component hole.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

LIST OF REFERENCE CHARACTERS

1 Stop holder
2 Head unit
4 Component hole
6 Intermediate piece
8 Shaft
10 Tool
12 Depression
14 Component
16 Component
18 Primary structure
20 Base body
22 Assembly section 24 Tool space
26 Rest section
28 Lateral opening
30 Lateral opening
32 Toothed ring
34 First contact surface
36 Projection
38 Second contact surface
40 Adjustment element
42 Securing element
44 External thread
46 Internal thread
48 Third contact surface
50 Internal thread
52 Edge
54 Component hole
56 Front surface
h Height displacement
a Distance
b Distance

The invention claimed is:

1. A head unit for a stop holder for stabilizing a drilling machine during at least one of placement and machining of a component hole in at least one component that is arranged so as to be adjacent to, or in sections overlapping with, some other component, the head unit comprising:
   a tubular base body which by way of a rear assembly section is configured to be detachably attached to the stop holder,
   an axial tool space for leading through a tool chucked in the stop holder, and
   a front rest section arranged to rest on two of the adjacent components,
   the front rest section comprising a front projection that forms a second contact surface, which is displaced in an axial direction relative to a first contact surface of the front rest section;
   wherein one of the two adjacent components has a height displacement relative to the other of the two adjacent components in a region of the component hole to be processed;
   wherein the front projection is provided to compensate for the height displacement;
   wherein the second contact surface presses on the component which is located lower in the axial direction than the adjacent component;
   wherein the front rest section interacts with an adjustment element that forms a third contact surface that is adjustably positionable in the axial direction;
   wherein, in case the height displacement between the two adjacent components is smaller than the axial displacement between the first contact surface and the second contact surface on the front projection, the third contact surface is positionable at an axial displacement from the second contact surface smaller than the axial displacement between the first contact surface and the second contact surface;
   wherein in this case, the third contact surface acts as a contact and presses on the component which is located higher in the axial direction than the adjacent component instead of the first contact surface, in order to stabilize the head unit before processing the component hole.

2. The head unit according to claim 1, wherein the third contact surface is displaceable in the axial direction from the first contact surface towards and beyond the second contact surface.

3. The head unit according to claim 1, wherein the adjustment element is an adjustment ring that is guided on the rest section so as to be movable in the axial direction.

4. The head unit according to claim 3, wherein the front rest section has an external thread, and the adjustment ring has a corresponding internal thread.

5. The head unit according to claim 1, wherein the front rest section interacts with a securing element for undoably securing the adjustment element in a target position.

6. The head unit according to claim 5, wherein the securing element is a securing ring that is movably guided on the front rest section in the axial direction, wherein the securing ring is capable of directly or indirectly contact the adjustment element.

7. The head unit according to claim 6, wherein the securing ring has an internal thread that corresponds to an external thread of the front rest section.

8. A stop holder comprising a head unit for stabilizing a drilling machine during at least one of placement and machining of a component hole in at least one component that is arranged so as to be adjacent to, or in sections overlapping with, some other component, the head unit comprising:
   a tubular base body which by way of a rear assembly section is configured to be detachably attached to the stop holder,
   an axial tool space for leading through a tool chucked in the stop holder, and
   a front rest section arranged to rest on two of the adjacent components,
   the front rest section comprising a front projection that forms a second contact surface, which is displaced in an axial direction relative to a first contact surface of the front rest section;
   wherein one of the two adjacent components has a height displacement relative to the other of the two adjacent components in a region of the component hole to be processed;
   wherein the front projection is provided to compensate for the height displacement;
   wherein the second contact surface presses on the component which is located lower in the axial direction than the adjacent component;
   wherein the front rest section interacts with an adjustment element that forms a third contact surface that is adjustably positionable in the axial direction;
   wherein in case the height displacement between the two adjacent components is smaller than the axial displacement between the first contact surface and the second contact surface on the front projection, the third contact surface is positionable at an axial displacement from the second contact surface smaller than the axial displacement between the first contact surface and the second contact surface;
   wherein in this case, the third contact surface acts as a contact and presses on the component which is located higher in the axial direction that the adjacent component instead of the first contact surface, in order to stabilize the head unit before processing the component hole.

9. A method for stabilizing a drilling machine during the placement and/or machining of a component hole in at least one component that is arranged so as to be adjacent to, or in sections overlapping with, some other component, the drilling machine having a head unit comprising:

a tubular base body which by way of a rear assembly section is configured to be detachably attached to a stop holder, an axial tool space for leading through a tool chucked in the stop holder, and a front rest section arranged to rest on two of the adjacent components, the front rest section comprising a front projection that forms a second contact surface, which is displaced in an axial direction relative to a first contact surface of the front rest section;

wherein one of the two adjacent components has a height displacement relative to the other of the two adjacent components in a region of the component hole to be processed;

wherein the front projection is provided to compensate for a height displacement;

wherein the second contact surface presses on the component which is located lower in the axial direction than the adjacent component;

wherein the front rest section interacts with an adjustment element that forms a third contact surface that is adjustably positionable in the axial direction;

wherein in case the height displacement between the two adjacent components is smaller than the axial displacement between the first contact surface and the second contact surface on the front projection, the third contact surface is positionable at an axial displacement from the second contact surface smaller than the axial displacement between the first contact surface and the second contact surface;

wherein in this case, the third contact surface acts as a contact and presses on the component which is located higher in the axial direction that the adjacent component instead of the first contact surface, in order to stabilize the head unit before processing the component hole, comprising the steps of:

measuring a height displacement between the components, setting the height displacement on the stop holder, positioning the drilling machine with the mounted stop holder on the components in a target position, wherein the second contact surface of the head unit of the stop holder is pressed against the lower component, and the first contact surface is pressed against the upper component, and placing and/or machining the component hole.

10. The method according to claim 9, wherein the height displacement is secured on the head unit.

\* \* \* \* \*